United States Patent
Franchet et al.

(10) Patent No.: US 7,781,698 B2
(45) Date of Patent: Aug. 24, 2010

(54) PROCESS FOR MANUFACTURING A COILED INSERT OF COATED FILAMENTS

(75) Inventors: Jean-Michel Patrick Maurice Franchet, Paris (FR); Gilles Charles Casimir Klein, Mery sur Oise (FR); Louis Salvat, Tignieu (FR)

(73) Assignees: SNECMA, Paris (FR); FSP-One, Pont de Cherruy (FR)

( * ) Notice: Subject to any disclaimer, the term of this patent is extended or adjusted under 35 U.S.C. 154(b) by 1125 days.

(21) Appl. No.: 11/420,648

(22) Filed: May 26, 2006

(65) Prior Publication Data

US 2006/0269746 A1    Nov. 30, 2006

(30) Foreign Application Priority Data

May 27, 2005    (FR) .................................. 05 51409

(51) Int. Cl.
*B23K 26/32* (2006.01)
*B23K 26/20* (2006.01)
*B32B 15/02* (2006.01)
*B23P 15/00* (2006.01)

(52) U.S. Cl. .................. 219/121.64; 428/364; 428/367; 428/388; 428/389; 419/49; 228/265

(58) Field of Classification Search ............ 219/121.64; 228/120, 121, 245; 428/364, 367, 388, 389; 419/49

See application file for complete search history.

(56) References Cited

U.S. PATENT DOCUMENTS

| | | | |
|---|---|---|---|
| 3,584,657 A * | 6/1971 | Dorr et al. .................. | 138/142 |
| 3,638,298 A | 2/1972 | Sinizer et al. | |
| 3,763,001 A | 10/1973 | Withers | |
| 3,942,231 A * | 3/1976 | Whitaker .................. | 29/889.7 |
| 4,147,381 A * | 4/1979 | Schwarz ..................... | 285/53 |
| 4,292,725 A * | 10/1981 | Larsson et al. ............. | 29/419.1 |
| 5,133,282 A * | 7/1992 | Bates et al. ................. | 118/420 |
| 5,269,988 A * | 12/1993 | Coetzer ...................... | 264/614 |
| 5,897,922 A | 4/1999 | Saxena et al. | |
| 6,698,645 B1 * | 3/2004 | Buchberger et al. ...... | 228/173.1 |

(Continued)

FOREIGN PATENT DOCUMENTS

DE    003125626 A1 *    1/1983

(Continued)

OTHER PUBLICATIONS

U.S. Appl. No. 11/420,658, filed May 26, 2006, Franchet, et al.

(Continued)

*Primary Examiner*—Samuel M Heinrich
(74) *Attorney, Agent, or Firm*—Oblon, Spivak, McClelland, Maier & Neustadt, L.L.P.

(57) ABSTRACT

A process for manufacturing a coiled insert of coated filaments is disclosed. Each filament includes a ceramic fiber coated with a metal sheath. The process includes a step of winding a sheet of coated filaments around a piece. At the start of winding, a first metal shim is placed beneath the sheet and coiled. At the end of winding, a second metal shim is placed on the sheet and coiled. The process is applied to the manufacture of aeronautical turbomachine components.

10 Claims, 4 Drawing Sheets

U.S. PATENT DOCUMENTS

| | | | |
|---|---|---|---|
| 6,991,370 B2 * | 1/2006 | Kofune et al. | 374/179 |
| 7,170,156 B2 * | 1/2007 | Lee et al. | 257/684 |
| 7,507,935 B2 * | 3/2009 | Franchet et al. | 219/121.64 |
| 2005/0284085 A1 * | 12/2005 | Schneider et al. | 52/738.1 |
| 2006/0269746 A1 | 11/2006 | Franchet et al. | |

FOREIGN PATENT DOCUMENTS

| | | | |
|---|---|---|---|
| EP | 0551574 A1 * | 7/1993 | |
| EP | 0 931 846 A1 | 7/1999 | |
| JP | 08170127 A * | 7/1996 | |

OTHER PUBLICATIONS

U.S. Appl. No. 11/420,615, filed May 26, 2006, Franchet, et al.
U.S. Appl. No. 11/441,156, filed May 26, 2006, Franchet, et al.
U. S. Appl. No. 11/420,648, filed May 26, 2006, Patent App. Publication No. 2006/0269746, Franchet et al.
U. S. Appl. No. 12/670,786, filed Jan. 26, 2010, Dunleavy et al.
U. S. Appl. No. 12/670,767, filed Jan. 26, 2010, Dunleavy et al.

* cited by examiner

US 7,781,698 B2

PROCESS FOR MANUFACTURING A COILED INSERT OF COATED FILAMENTS

BACKGROUND OF THE INVENTION

The invention relates to the manufacture of a component incorporating an insert made of a composite of the type consisting of ceramic fibers in a metal matrix.

In the field of aeronautics in particular, one constant objective is to optimize the strength of components for a minimum mass and minimum size. Certain components may hereafter include an insert made of a metal matrix composite, the component possibly also being monolithic. Such a composite comprises a metal alloy matrix, for example a titanium (Ti) alloy, within which fibers extend, for example silicon carbide (SiC) ceramic fibers. Such fibers have a tensile strength very much greater than that of titanium (typically 4000 MPa compared with 1000 MPa). It is therefore the fibers that take the loads, the metal alloy matrix providing a function of binder with the rest of the component and also the function of protecting and isolating the fibers, which must not come into contact with one another. Furthermore, the ceramic fibers are resistant to erosion but necessarily have to be reinforced with metal.

These composites may be used in the manufacture of disks, shafts, ram bodies, casings, and spacers, such as reinforcements for monolithic components such as blades, etc.

DESCRIPTION OF THE PRIOR ART

To obtain such a composite insert, filaments called "coated filaments", comprising a metal-coated ceramic fiber, are formed beforehand. The metal gives the filament the elasticity and the flexibility needed for handling it. Preferably, a very fine carbon or tungsten filament lies at the center of the fiber, along its axis, this carbon filament being coated with silicon carbide, while a thin film of carbon is provided at the interface between the fiber and the metal, in order to provide a diffusion-barrier/buffer function during differential thermal relaxation that occurs as the liquid metal deposited on the fiber cools.

The manufacture of composite filaments, or coated filaments, may be carried out in various ways, for example by vapor deposition of metal in an electric field, by electrophoresis using a metal powder, or else by dip-coating ceramic fibers in a bath of liquid metal. Such a coating process, in which ceramic fibers are dipped into a liquid metal, is presented in patent EP 0 931 846 in the name of the Applicant. This process is much more rapid than the other processes mentioned. Thus, composite filaments or coated filaments are obtained that serve as the basis for the formation of the composite insert which will be included in the component.

In the known processes for obtaining a component with an insert made of a metal alloy matrix composite, the coated filament is formed from a workpiece called a preform. Such a preform is obtained by winding the coated filament between two metal retaining flanges that extend around a central mandrel. The winding is performed in a spiral, the preform obtained being in the form of a disk, the thickness of which is that of the coated filament constituting it. To ensure cohesion of the preform, the retaining flanges include apertures through which a material providing a bonding function, for example an acrylic resin, is sprayed.

FIG. 1 shows schematically one embodiment of a component with a composite insert. Referring to FIG. 1, a plurality of preforms 1, each in the form of a disk, are stacked in a container 2 of cylindrical overall shape. The container has an annular cavity 3, the sectional shape of which, transverse to the axis 4 of the container, is that of the preforms 1. Preforms 1 are stacked until the entire height of the cavity 3 is filled. Typically, 80 preforms are thus stacked. This operation is manual.

It is then necessary to perform a binder-removal operation followed by a degassing operation, so as to eliminate the binder, for example an acrylic resin, from the preforms 1. This is because no contaminating element must remain, when cold and hot, in contact with the titanium during the pressing stage.

An annular lid 5, having a projection 6 of shape complementary to that of the annular cavity, but of smaller axial dimension, is placed on top of the container 2, the projection 6 being brought into contact with the upper preform 1. The lid 5 is welded to the container 2, for example by electron beam welding, the assembly preferably being placed in a vacuum. There follows a step in which the assembly undergoes hot isostatic pressing. During this operation, the insert composed of juxtaposed coated filaments is compacted, the metal sheaths of the coated filaments being welded together and welded to the walls of the cavity 3 of the container 2 by diffusion, in order to form a dense assembly composed of the metal alloy (for example a titanium alloy) within which the ceramic (for example SiC) fibers extend annularly.

A cylindrical component is obtained that includes an insert of a composite, resulting from the compaction of the stacked preforms 1. This component may optionally undergo a stress relaxation treatment, making it possible to compensate for the differential expansion between the ceramic fibers and the metal, in which they are embedded, when the assembly cools.

The component is then generally machined so as to obtain the final component. For example, if the objective is to manufacture a one-piece compressor disk—the term "one-piece" meaning that the blades are formed from a single component with the disk—the container, including its composite insert, is machined so as to form a one-piece bladed disk or "blisk", one part of the rim supporting the blades including the composite insert. The rim is of much smaller dimensions than the rims of conventional monolithic disks made of a metal alloy, thanks to the high stiffness and high strength conferred on the assembly by the ceramic fibers of the ceramic composite, contained in the mass of the rim. In particular, such a rim may be in the form of a simple ring, and not in the form of a flange or disk in the absence of the insert.

This process for manufacturing a component with a composite insert has many drawbacks, and cannot be exploited on an industrial scale owing to the length, complexity and precision required of its steps.

Firstly, since the ceramic fibers are brittle, the operations on the coated filaments must above all prevent any contact between them, and the welding of coated filaments has not been envisaged hitherto.

Furthermore, the binder-removal and degassing operations are not only lengthy, but there is never certainty that all of the binder has been removed. To ensure complete disappearance of the binder, necessary in particular for the correct subsequent behavior of the titanium alloy, several binder-removal and degassing steps are needed. This lengthens the total duration of the process and increases its overall cost.

In addition, should the filament break while it is being wound between the two flanges, it is necessary to form a new preform in so far as at the present time no means exist for solving the problem and resuming the winding.

Moreover, the step of positioning the coated filament preforms in the container is currently manual. The cost of the operation and in particular its precision are affected thereby. Now, the positioning of the coated filament in the container is a critical factor in the manufacturing sequence in so far as it determines the performance of the composite, with a very great influence of the orientation of the ceramic fiber according to the principal stresses of the component. It also determines the quality of the composite, by preserving the integrity of the ceramic fiber, during the various steps in the manufacture of the component. Lastly, it determines the final cost of the component, again because the operations of positioning the coated filaments are relatively lengthy and carried out manually. The positioning of the filaments in the container should therefore benefit from being improved.

SUMMARY OF THE INVENTION

Thus, the objective of the invention is to provide a method of producing a coiled insert of coated filaments that can be industrialized.

According to the invention, the process for manufacturing a coiled insert of coated filaments, each filament comprising a ceramic fiber coated with a metal sheath, is characterized in that it includes a step of winding a sheet of coated filaments bonded to each other onto a piece, in which step, at the start of winding, a metal shim for catching the internal part of the insert is coiled and, at the end of winding, a metal shim for catching the external part of the insert is coiled.

BRIEF DESCRIPTION OF THE DRAWINGS

The invention will be more clearly understood and other features will emerge from the description that follows of the implementation of the process with reference to the drawings in which.

DESCRIPTION OF THE PREFERRED EMBODIMENTS.

The invention is linked with the formation of a component that includes an insert made of a metal matrix composite, in which ceramic fibers extend. The composite is obtained by the prior manufacture of filaments, comprising a metal-coated ceramic fiber. In one embodiment of the invention, this is a silicon carbide (SiC) ceramic fiber coated with a titanium alloy. Preferably, a very fine carbon or tungsten filament lies at the center of the fiber, along its axis. This carbon filament is coated with silicon carbide, while a thin film of carbon is provided at the interface between the fiber and the metal in order to provide a diffusion-barrier/buffer function during differential thermal expansion that occurs as the liquid metal deposited on the fiber cools. The manufacture of the composite filaments may be carried out in various ways, for example by vapor deposition of metal in an electric field, by electrophoresis using metal powder, or else by dip-coating fibers into a liquid metal bath. Preferably, it will be a coating process in which ceramic fibers are dipped into a liquid metal, as presented in patent EP 0 931 846 in the name of the Applicant. Thus, composite filaments, which hereafter will be called coated filaments, are obtained that serve as the basis for the manufacture of the composite insert that will be included in the component.

A process for manufacturing a bonded sheet of coated filaments will firstly be described.

First, a plurality of coated filaments are produced according to one of the known techniques, preferably by a coating process in which ceramic fibers are dipped into a bath of liquid metal. These filaments are each wound onto a bobbin. Each filament has for example a diameter of 0.2 to 0.3 mm.

Figure 1:
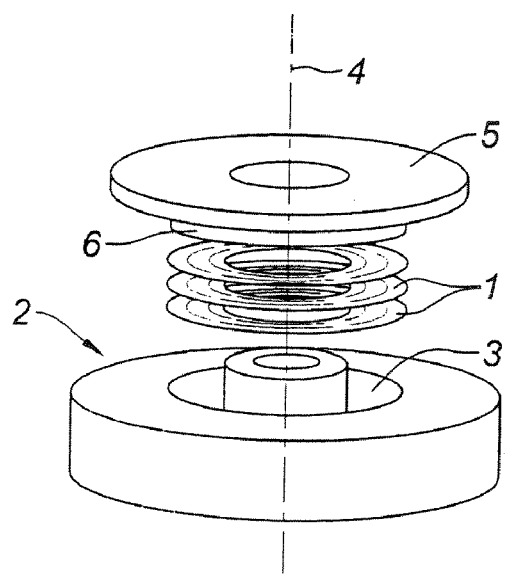
FIG. 1 shows a schematic perspective view of an operation for obtaining a component with a composite insert of the prior art.
Figure 2:
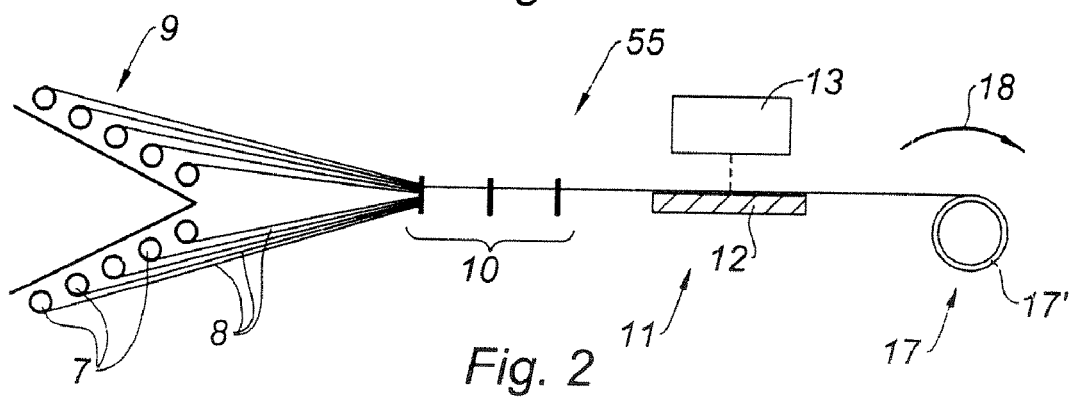
FIG. 2 shows a schematic view of a device for manufacturing a bonded sheet of coated filaments.

Referring to FIG. 2, a plurality of bobbins 7, each with a coated filament 8 wound around its circumference, is placed on a module 9 of bobbins 7. This module 9 makes it possible to place the bobbins 7 in such a way that they can be unwound toward a warping module, presented below, without the filaments 8 crossing one another. In this case, the bobbin module 9 has a structure in the form of an isosceles triangle supporting the bobbins 7, one half of them along one side of the triangle and the other half along the other side, the apex of the triangle being directed on the side to which the filaments 8 are unwound from the bobbins 7, toward a point located on the axis of symmetry of the triangle that forms the structure of the bobbin module 9.

In another embodiment, each bobbin 7 may support a bundle of coated filaments. Thus, to form a sheet of one hundred coated filaments, ten bobbins 7, each having a bundle of ten coated filaments wound around its circumference, may be used.

The coated filaments 8 are unwound toward a warping module 10. This warping module 10 is shown here in a schematic and undetailed manner as its structure is accessible to a person skilled in the art. It is comparable to a warping module used in the weaving field. The warping module 10 includes guiding means allowing the filaments 8 to be stretched parallel to one another, as a layer in one and the same plane, without mutual overlap in contact with one another. The objective is to form a flat sheet of parallel filaments 8 in contact with one another.

The filaments 8 thus warped are driven into a laser welding module 11. This module includes a flat support 12 over which the filaments 8 move, above which support a laser welding device 13 is mounted. The filaments 8 are therefore driven past the laser welding device 13. The whole assembly is preferably contained in an inert atmosphere, for example an atmosphere of argon injected via a nozzle. The laser welding device 13 may for example comprise a neodymium (Nd)-doped YAG (yttrium aluminum garnet) laser, which has the advantage of high precision with respect to its power and to the point of impact of its laser beam, and also the advantage of having a very fine beam. The laser will preferably have a power of between 2 and 5 W.

Downstream of the laser welding module 11, the filaments 8 are driven by a module 17 for pulling the filaments 8, from the bobbin module 9, translationally over the support 12. This drive module 17 comprises in this case a rotating bobbin 17' around which the filaments 8 are wound. The bobbin 17' is rotated as shown by the arrow 18. Thus, the filaments 8 are driven from their bobbin 7 of the bobbin module 9 along the warping module 10 and the laser welding module 11 by the drive module 17, the whole assembly forming a device 55 for forming a bonded sheet of coated filaments 8. The bonded sheet is wound up onto the bobbin 17' of the drive module.

Figure 5:
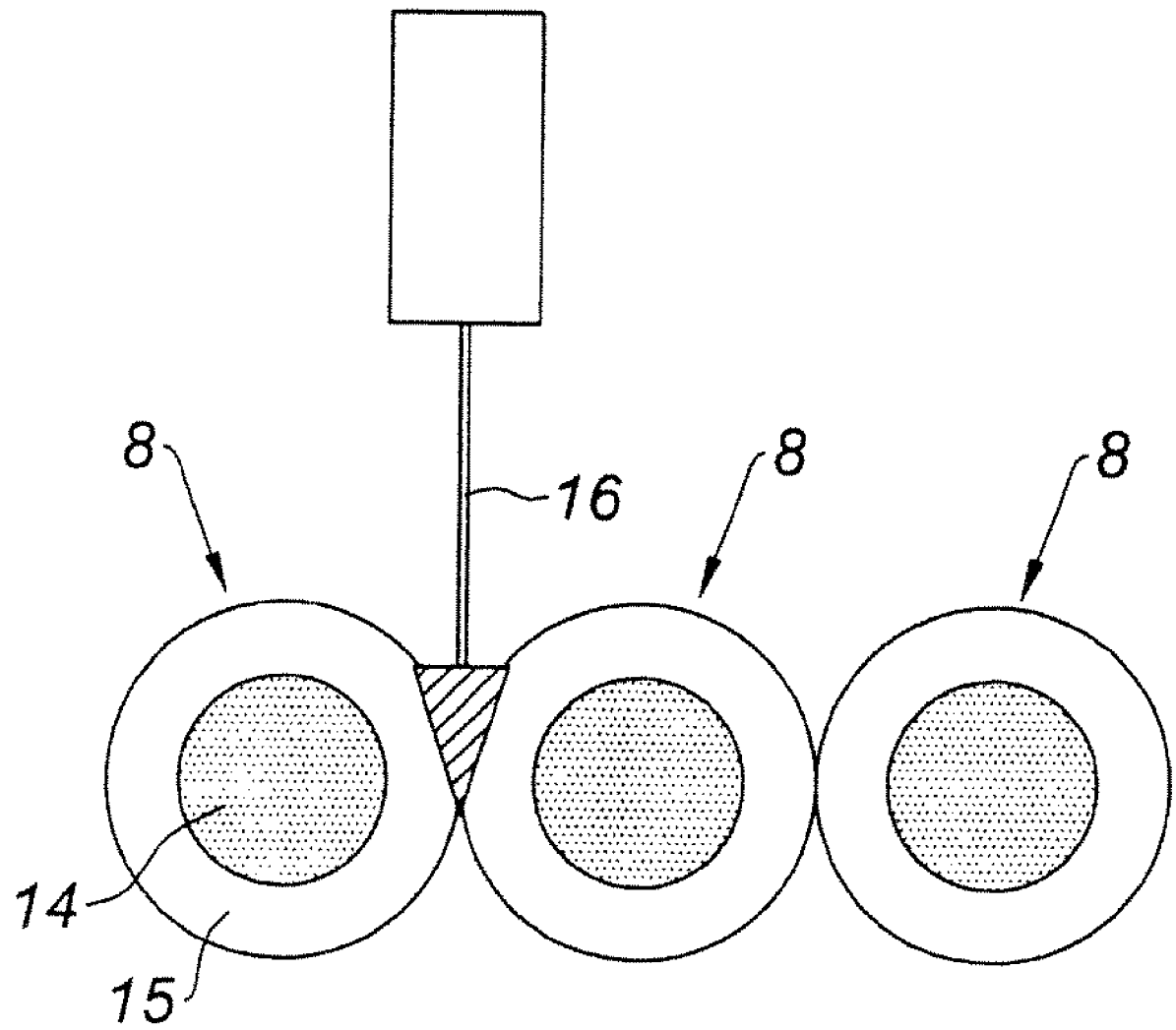
FIG. 5 shows a sectional schematic view, in a plane transverse to the direction in which the coated filaments run, at the laser welding module of the device of FIG. 2, for welding two filaments together.

FIG. 5 shows a sectional representation, in a plane transverse to the direction in which the filaments 8 run, at the laser welding module 11 for welding two filaments 8 together. The welding is carried out by spot welding using the laser welding device 13. Each filament 8 is joined to its neighbors by a plurality of spot welds. Each filament 8 comprises, as was seen previously, a ceramic fiber 14 coated with a metal sheath 15, for example one made of a Ti alloy. The laser beam is directed, as indicated by the arrow 16, in the direction of a contact point between two successive filaments 8, perpendicular to the plane containing all the axes of the filaments 8 driven along the support 12. This results in local melting of their metal sheath 15. The laser is used at low power, but highly concentrated, so as to ensure that the ceramic fiber 14 is not affected by this local melting. A minimum volume of the metal sheath 15 is melted. It is sufficient to ensure that the filaments 8 are joined together at this point. The welding parameters are optimized in such a way that the weld pool resulting from the melting of the metal does not flow out.

It is important for the laser beam to be directed along a point region overlapping two filaments 8, perpendicular to the plane of the filaments 8, so that it does not damage the ceramic fibers 14, the integrity of which is a condition necessary for the operation that is assigned thereto, in the application to the manufacture of a component with a composite insert.

It is unnecessary for the spot welds to be very strong. Their function is solely to ensure overall consolidation, or mutual retention, of the filaments 8 for the purpose of forming a bonded sheet. This consolidation must just be strong enough to allow the sheet to be handled, and possibly wound and unwound, for the purpose for example of constituting a component with a composite insert. The welding is therefore just to keep the filaments 8 together.

Figure 3:
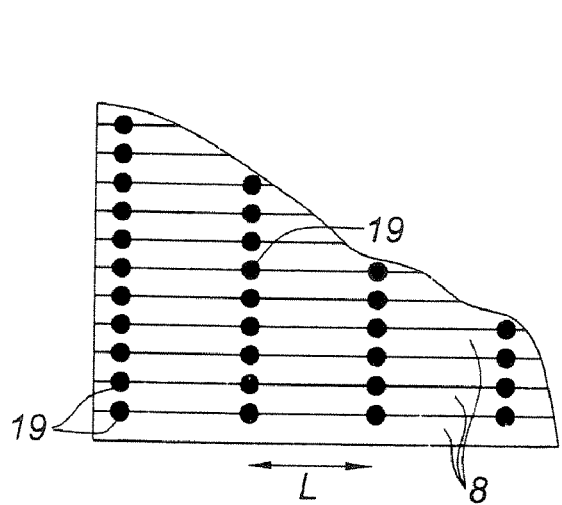
FIG. 3 shows a schematic view from above of a sheet formed according to a first operating mode of the device of FIG. 2.
Figure 4:
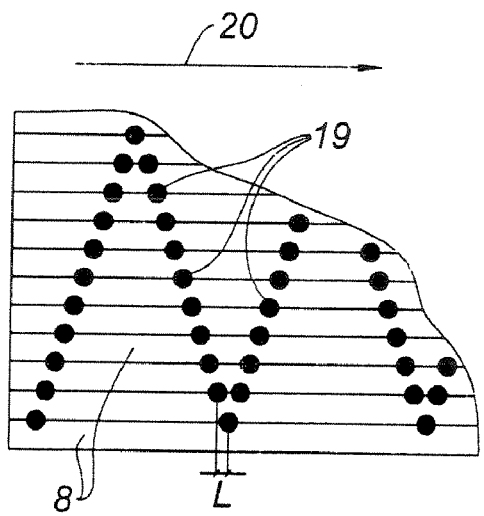
FIG. 4 shows a schematic view from above of a sheet formed according to a second operating mode of the device of FIG. 2.

FIGS. 3 and 4 show schematically two envisaged operating modes for the laser welding module 11, in this case for the formation of a sheet comprising twelve coated filaments 8.

In the operating mode in FIG. 3, when the coated filaments 8 are located beneath the laser welding device 13, the drive module 17 is stopped so as to leave the filaments 8 stationary. The welding device 13 then produces a series of spot welds between the adjacent filaments 8, along a segment perpendicular to the direction in which they run beneath the welding device 13. For this purpose, the welding device 13 makes a first spot weld 19 between two filaments 8, as explained above with reference to FIG. 5. It is then stopped and moved, perpendicular to the run direction of the filaments 8, so as to be in line with the next contact point between two filaments 8, which it welds in a second spot weld 19, and so on, until all the filaments 8 have been joined together along this displacement segment. The welding device 13 therefore makes a segment of spot welds 19, perpendicular to the run direction of the filaments 8 beneath the welding device 13. The drive module 17 is then actuated so as to make the filament 8 run over a length "L" past the welding device 13 and then the operation is repeated on another segment, parallel to the first one.

In the operating mode shown in FIG. 4, the filaments 8 are driven continuously, in the run direction and sense that are shown by the arrow 20, this movement being imposed by the drive module 17. The welding device 13 performs the same operations as previously, namely a welding operation, and then the displacement toward the next point along a path perpendicular to the direction 20 in which the filaments 8 move, etc., from the first filament 8 to the last one, and then in the reverse manner. If the speed of movement of the filaments 8 is low enough, the welding of the spot welds 19 between two moving filaments 8 is possible. A series of spot welds 19 is therefore produced between the filaments 8, which forms a zigzag over the sheet formed by the filaments 8.

It is also possible to obtain such a distribution of the zigzagged spot welds 19 by stopping the drive module 17 when welding each spot weld 19, the drive module 17 driving the filaments 8 over a short distance "l" between each spot weld 19, while the welding device 13 is moved.

It is also possible to operate with only the movement of the filaments 8 being slowed down at the moment of forming the spot welds 19.

The advantage of such a distribution of the spot welds 19 is its greater uniformity over the surface of the sheet formed by the filaments 8.

Whatever the case, on leaving the laser welding module 11, the filaments 8 are in the form of a bonded sheet within which they are joined together at the retaining spot welds 19. The sheet is wound up onto the bobbin 17' of the drive module 17.

Reference has not been made here to the set-up phase of the process for manufacturing a bonded sheet of coated filaments 8. This phase may be freely adapted by those skilled in the art, for example by winding, at the start of the process, the filaments 8 onto the bobbin 17' without them being joined together, the innermost portion of the final wound sheet therefore not being in sheet form, or for example by driving the filaments at the start of the process using another drive device and by connecting them to the bobbin 17' when they start to be in the form of a sheet.

The distance "L" between the segments of spot welds 19 within the context of the segment configuration shown in FIG.

3, or else the longitudinal distance "l" between two successive spot welds 19, in the zigzag configuration shown in FIG. 4, is set according to the desired rigidity of the sheet of coated filaments 8. Thus, for a rigid sheet, the spot welds 19 will be close together, while for a flexible sheet, the spot welds 19 will be further apart. Other configurations of distribution of spot welds 19 are of course conceivable. The configuration and the spacings of the spot welds 19 will be chosen according to the application to which the bonded sheet is intended, especially if it has to be coiled, twisted, etc., while still respecting a minimum space so as to ensure cohesion of the whole assembly under the defined conditions of the application. The specifications relating to the configuration of the distribution of the spot welds 19 are less dependent on the process itself than on the application to which the sheet of coated filaments 8 is intended.

Thanks to the speed of execution of the laser welding and its precision, it is possible to manufacture a bonded sheet of coated filaments 8, the filaments 8 being joined together, in an automated system, on an industrial scale, in order to implement the process that has just been described. Large quantities of sheets of coated filaments 8 are thus rapidly obtained—it is possible to form several kilometers of the same sheet—in a form that can be exploited in various ways. Moreover, the sheets are bonded together by melting of the metal sheath 15 of the filaments 8, and therefore without addition of material, especially without the addition of a binder such as an adhesive, thereby making it possible to eliminate, in a more general process for manufacturing a component with a composite insert using coated filaments, all the binder-removal steps.

One process for manufacturing a component with a composite insert, which includes a step of winding a bundle or sheet of coated filaments, will now be described.

The process includes a step of winding a bundle or sheet of coated filaments onto an intermediate part which is then incorporated into the cavity of a container, i.e. directly on an internal part of the container, which is then completed with an external part. Thus, instead of stacking, over the entire height of the cavity, preforms with the width of that of the cavity, a bundle or sheet of coated filaments is wound, the width of which corresponds to the height of the cavity, the number of layers allowing the width of the cavity to be filled.

Figure 6:
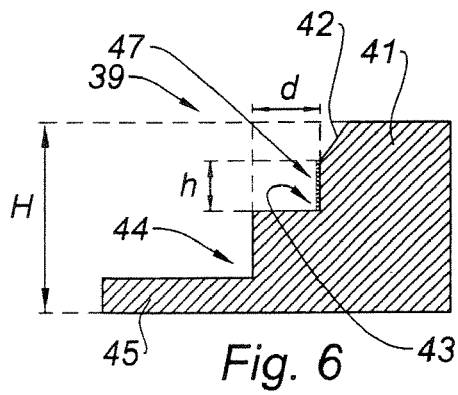
FIG. 6 shows a partial schematic sectional view of a component forming the internal part of a container, for implementing a first method of carrying out a process for manufacturing a component with a composite insert by winding a bundle or sheet of coated filaments, at the start of winding.
Figure 7:
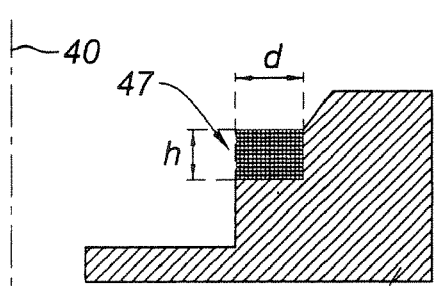
FIG. 7 shows a partial schematic sectional view of the component of FIG. 6, at the end of the winding process.
Figure 8:
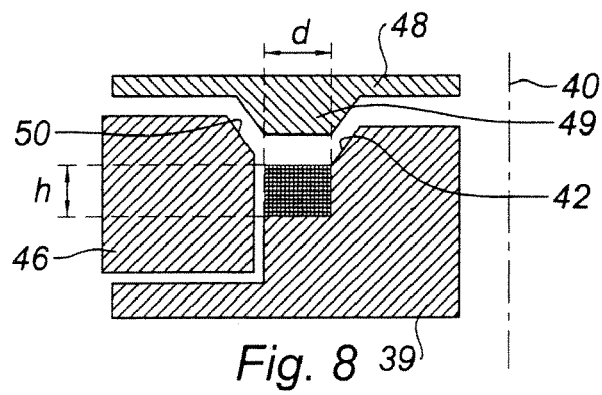
FIG. 8 shows a partial schematic sectional view of the component of FIG. 7, to which an outer ring and a lid have been added.

A first method of implementing the process is shown in FIGS. 6 to 8. In this method of implementation, a piece 39, forming an internal part of a container, is machined beforehand. The term "container" is understood to mean a body of revolution about an axis 40, having an annular cavity designed to receive coated filaments.

Such a container is preferably made of the same metal as the coating for the coated filaments, here a Ti alloy. The piece 39 forming an internal part of a container is a one-part body of revolution about an axis 40. Its internal portion 41 has a height "H" equal to the height of the container—the term "height" is understood to mean the axial dimension. The piece 39 includes, peripherally with respect to this internal portion 41, a chamfered portion 42 providing a first shoulder 43 of height "h" and width "d", which corresponds to the height "h" and the width "d" of the annular cavity of the container. The term "width" is understood to mean the radial dimension. Extending from the periphery of this first shoulder 43 is a second shoulder 44, the radial dimension of which completes the width of the container, its surface extending to a height of less than the height of the surface of the annular cavity.

In other words, the piece 39 forming an internal part of the container corresponds to the container, at which an outer ring, of height less than the height of the container, is removed, which may be seen by the reference 46 in FIG. 8, thus freeing the radial space lying to the outside of the annular cavity formed in the container.

It is thus possible to bring a bundle or sheet of coated filaments 47 onto the wall forming the height "h" of the first shoulder 43, this shoulder 43 corresponding to the annular cavity without its external wall.

To wind a bundle or sheet of filaments 47 onto the part 39, it is preferable during the first turn, to fasten these filaments to the wall of the shoulder 43. This fastening is preferably obtained by the contact welding process between two electrodes and passage of a medium-frequency current, which will not be described in detail here.

If there is a bundle of coated filaments 47, it is for example possible, in order to pay out the bundle, to use a bobbin module and a warping module that are similar to those of FIG. 2 in the case of the process for manufacturing a sheet, the warped bundle then being directly wound onto the piece 39.

If there is a preformed sheet of coated filaments 47, this will preferably be formed according to the process for manufacturing a sheet as described above. The sheet, wound onto a bobbin, for example the bobbin 17' of the drive module 17 of the device for manufacturing a sheet as shown in FIG. 2, is paid out in order to be wound onto the piece 39 forming the internal part of the container.

It is also possible to wind, onto the piece 39, a sheet, directly replacing the bobbin 17' of the drive module 17 of FIG. 2 with the piece 39 forming an internal part of the container. The coated filaments are thus warped, formed into a sheet and then wound onto the piece 39. However, this sheet-forming operation is optional.

In the three cases, the piece 39 forming the internal part of a container is here rotated about its axis 40 so as to wind the bundle or sheet of coated filaments 47. Referring to FIG. 7, once the required number of layers of filaments have been wound, in this case a number of layers allowing the width "d" of the shoulder 43 corresponding to the annular cavity to be filled, the bundle or sheet of coated filaments 47 is again consolidated, this time during the winding operation, preferably by a contact welding process between two electrodes, and then cut. In this case, the bundle or sheet of coated filaments 47 is welded to the lower layer(s).

Referring to FIG. 8, the outer ring 46 forming the external part of the container is then added around the piece 39 forming the internal part. This ring 46 may optionally be welded, preferably by electron beam welding, or just held in position. Thus, a container is again properly formed, with its annular cavity in which the coated filaments are wound, not here in the form of preforms of width "d" stacked up to a height "h" but in the form of bundles or sheets of coated filaments 47, of width "h", which have been wound in a number of layers of total radial thickness equal to the width "d" of the annular cavity.

An annular lid 48 is then added, this lid having an annular projection 49 intended to complement the chamfer 42 of the piece 39 forming the internal part of the container and a chamfer 50 of the outer ring 46, concentric with the chamfer 42 of the piece 39, facing said chamfer 42. Lying between these two chamfers 42, 50 is the annular cavity with the layers of the bundle or sheet of coated filaments 47, on which coated filaments the annular projection 49 of the lid 48 bears.

Once the piece 39 forming the internal part, the outer ring and the lid have been put into place, the configuration is again as in the prior art, with a closed container including an insert of coated filaments. This assembly is then welded, preferably by electron beam welding, placed in a vacuum and then compacted by hot isostatic pressing in a known manner. This results in the formation of a composite insert, with a metal matrix within which ceramic fibers extend. It is therefore possible to machine this assembly in order to obtain the final component with its composite insert. It is also possible to machine this assembly in order to extract therefrom the composite insert as such.

One advantage of the process that has just been described is its speed of execution, since the steps of manufacturing and then stacking the preforms are omitted, while the winding of the coated filaments in the form of a bundle or sheet is much more rapid. Moreover, no additional material, such as for example adhesive, is necessary. This results, on the one hand, in a composite insert of better quality and, on the other hand, in the elimination of the binder-removal and degassing operations, and therefore in considerable time saving.

Figure 9:
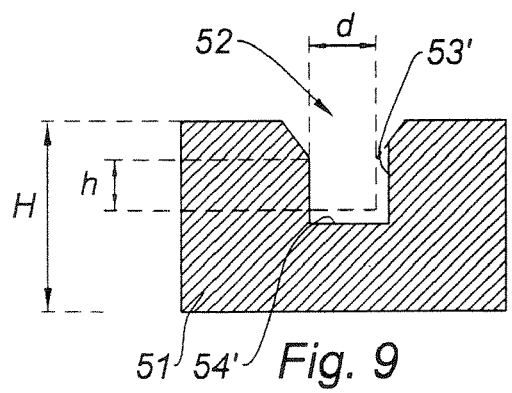
FIG. 9 shows a partial schematic sectional view of a container with an annular cavity, for implementing a second method of carrying out a process, described in the present application, for manufacturing a component with a composite insert by winding a bundle or sheet of coated filaments.
Figure 10:
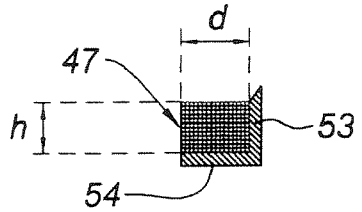
FIG. 10 shows a partial schematic sectional view of a mandrel for implementing the second method of implementing the process, described in the present application, for manufacturing a component with a composite insert by winding a bundle or sheet of coated filaments.
Figure 11:
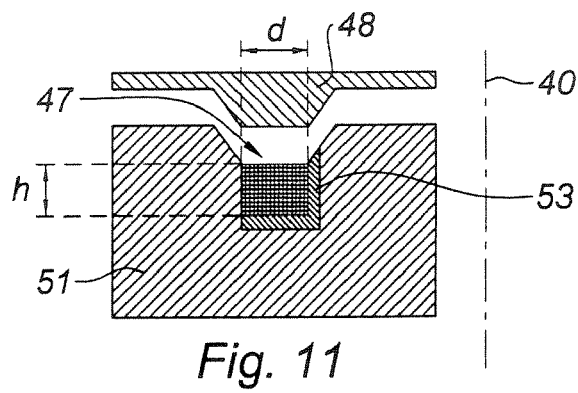
FIG. 11 shows a step of fastening a lid to the container of FIG. 9.

A second method of implementing the process is shown in FIGS. 9 to 11. In this method of implementation, a container 51 is formed beforehand, this being annular about an axis 40, of height "H", which includes an annular cavity 52, corresponding to a cavity of height "h" and width "d", the bottom wall 54' and internal wall 53' of which have been machined so as to obtain an annular cavity 52 of larger dimensions. FIG. 9 shows, by the dotted lines, the annular cavity of height "h" and width "d" and, by the solid lines, the cavity as machined, which is deeper and wider.

Referring to FIG. 10, an annular mandrel 53 with a radial rim 54 is also formed, said mandrel being intended to be housed in the widened annular cavity 52 of the container. The mandrel 53 is dimensioned in such a way that, when it is housed in the cavity 52, the resulting cavity is a cavity of height "h" and width "d", the wall 53 of the mandrel bearing on the internal wall 53' of the annular cavity 52 and its radial rim 54 bearing on its bottom wall 54'. The mandrel 53 here is made of the same material as the container 51, in this case a Ti alloy.

As previously, a bundle or sheet of coated filaments 47 is wound, this time onto the mandrel 53. The bundle or sheet has a total width of "h", and a number of layers are wound, the total thickness of which is equal to "d", namely the width of the radial rim 54 of the mandrel 53. Preferably, the start of the bundle or sheet is fastened to the mandrel by an electrode welding process, by contact between two electrodes.

Once the required number of layers of the bundle or sheet of coated filaments 47 have been wound, the last layer is fastened to the previous layer(s), preferably by a contact welding process between two electrodes, and then the bundle or sheet is cut. The mandrel 53 with its coil is then inserted into the annular cavity 52 of the container 51, as may be seen in FIG. 11. A lid 48, identical to the previous lid 48, is added and the assembly is welded by electron beam welding, placed in a vacuum, then compacted by hot isostatic pressing, and machined, in a well-known manner, in order to obtain the final component with its composite insert.

In the two methods of implementation that have been described, the coated filaments 47 are wound onto one another, always in the same plane. Seen in cross section, the axes of the filaments 47 therefore form a checkered arrangement, the basic mesh of which is a square mesh. To improve the compactness of the insert, it is preferable for each layer to be offset from the previous one by half the distance between the axes of two successive coated filaments, the axes of the filaments of three successive layers therefore being in a staggered arrangement with respect to one another. For this purpose, it is possible to provide two bobbins for paying out sheets 47, or two modules for paying out bundles of coated filaments 47, placed so that the sheets or bundles 47 are thus offset in a staggered configuration, and wound simultaneously, one on top of the other, onto the piece 39 forming the internal part of the container or onto the mandrel 53. Between the bobbins or modules and the piece 39, 53 onto which they are wound, may be a device for placing the filaments in contact with one another.

According to the invention, an insert of coated filaments is formed which includes metal shims for catching the start of the coil and the end of the coil, obtained by the process described above, the coiled insert with its catching shims is placed in the cavity of a container, an annular lid is added and the assembly is compacted by hot isostatic pressing so as to obtain a component with a composite insert.

Thus, the direct winding from one or more bundles or sheets of coated filaments makes it possible to control the arrangement, and therefore the density, of the ceramic fibers within the composite insert of the component.

One process for manufacturing a composite insert will now be described.

In the process for manufacturing a composite insert, which includes a step of winding a sheet of coated filaments, the sheet is fastened, at the start of winding, to the container or to a mandrel, and at the end of winding to the preceding layer, for example by contact welding between two electrodes.

It may be desirable to have an insert that includes no such welds and is not necessarily directly fastened to a container or to a mandrel, which insert can be handled and subsequently introduced into the annular cavity of a container.

Thus, the invention proposes a process for manufacturing an insert that includes a step of mechanically catching a sheet of coated filaments with a shim, at the start and at the end of winding.

Figure 15:
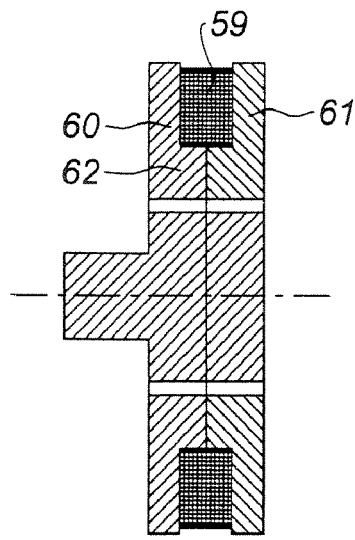
FIG. 15 shows a sectional partial schematic view of the end of the steps of catching the sheet of coated filaments of FIGS. 12 and 13.

Referring to FIG. 15, which shows the end of winding a sheet with catching steps using a shim at the start and end of winding, a sheet 59 of a plurality of coated filaments is wound between two flanges 60, 61, between which a mandrel 62 with which the flanges 60, 61 are integral extends. The flanges 60, 61 and the mandrel 62 thus form a body of revolution. Preferably, the sheet of coated filaments 59 is obtained by the process for manufacturing a sheet of coated filaments described above.

Figure 12:
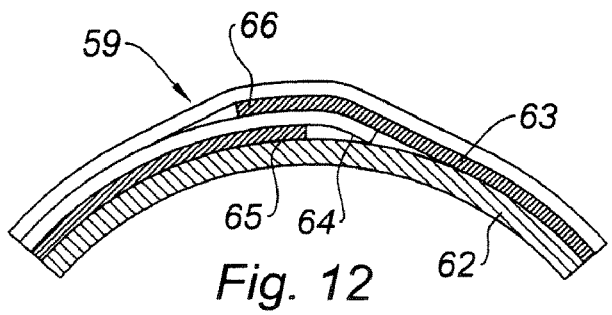
FIG. 12 shows a sectional partial schematic view of a step of catching a sheet of coated filaments, in a process for manufacturing an insert according to the invention, with a shim at the start of winding.

Referring to FIG. 12, during the winding of the first layer of the sheet 59, the sheet is wound with a shim 63, that is to say a metal foil. The shim is preferably made of the same material as the coating on the coated filaments, or a similar material, here a titanium alloy. Preferably, the shim has the same width as that of the sheet of coated filaments 59. Its length is slightly greater than the circumference of the mandrel 62 onto which it is wound.

The shim 63 is placed beneath the sheet 59 that has been wound, the first end portion 64 of the sheet 59 extending upstream beyond the first end portion 65 of the shim 63. The shim 63 and the sheet 59 are wound with one turn around the mandrel 62, the shim 63 therefore being in contact with the mandrel 62. At the end of the turn, the shim 63 passes on top of the first end portion 64 of the sheet 59 and partially covers it, its second end portion 66 being located above the level of the first end portion 65 of the shim 63 and therefore covering it, the shim 63 covering the first layer of the sheet 59, especially its end portion 64, between its two end portions 65, 66. The shim 63 thus provides the function of catching the sheet 59, here its first wound layer, and therefore the internal part of the insert that will be formed, since its second end portion 66 is then blocked by the winding of the other layers of the sheet 59.

Figure 13:
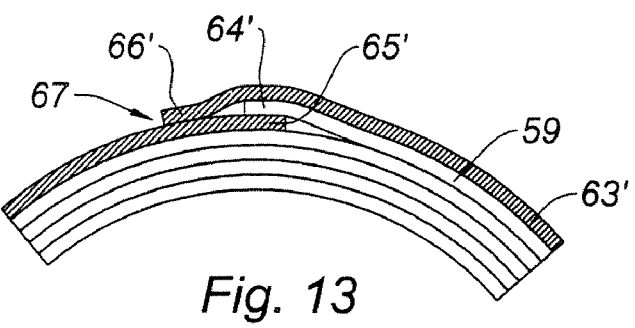
FIG. 13 shows a sectional partial schematic view of a step of catching a sheet of coated filaments, in a process for manufacturing an insert according to the invention, with a shim at the end of winding.

The winding of the sheet 59 is continued so as to wind the required number of layers and, at the end of winding, referring to FIG. 13, a further shim 63' is added and wound, on the last turn, on top of the last layer of the sheet 59 so as to provide the function of catching the sheet 59, here its last wound layer, and therefore the external part of the coiled insert. The end-of-winding shim 63' is similar to the start-of-winding shim 63, except for its length, which is longer and tailored to the circumference of the last layer of the sheet 59. The first end portion 65' of the shim 63' is placed beneath the second end portion 64' of the sheet 59, which corresponds to the end portion 64' of its last layer. The shim 63 is wound, by itself, around this last layer of the sheet 59 and its second end portion 66' passes on top of the second end portion 64' of the sheet 59, which is thus jammed between the first and second end portions 65', 66' of the end-of-winding shim 63'.

Preferably, the length of the end-of-winding shim 63' is chosen in such a way that its second end portion 66' passes on top of the second end portion 64' of the sheet 59 and can come into contact with the external surface of the end-of-winding shim 63', near its first end portion 65'. Preferably in this case, this second end portion 66' is welded to the external surface of the shim 63', along their band of contact 67, by any appropriate welding process. Any other fastening means may be employed.

Thus, a coil of coated filaments, wound as a plurality of layers, with a catching means on the internal side, namely the start-of-winding shim 63, and on the external side, namely the end-of-winding shim 63', is obtained. These shims 63, 63' hold the coil together, which can therefore be removed from the piece comprising the mandrel 62 and the flanges 60, 61, and handled as such. For this purpose, one of the flanges can be removed. This coil forms a coiled composite insert 68. The rigidity of the insert 68 depends on the chosen thickness of the shims 63, 63'. Typically, this thickness may be between 0.2 and 0.5 mm for a titanium alloy shim. The internal, or start-of-winding, shim 63 forms a support base for the coiled insert 68. The external, or end-of-winding, shim 63' forms the external envelope of the coiled insert 68.

Figure 14:
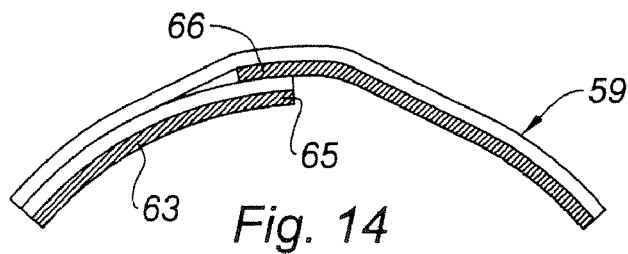
FIG. 14 shows a sectional partial schematic view of a step of cutting the shim at the start of winding of FIG. 12.

Once the insert 68 has been removed from its support, the first end portion 64 of the sheet 59 extends, on the internal side, beyond the first end portion 65 of the shim 63. Preferably, referring to FIG. 14 in which only the two first layers of the coiled insert 68 have been shown, this end portion 64 is cut, flush, in line with the end of the shim 63.

Preferably, the second end portion 66 of the internal shim 63 and the first end portion 65' of the external shim 63' are of smaller thickness than the rest of the shim 63, 63' in question, at least over their portion intended to be located in line with both an end portion 64, 64' of the sheet 59 and with the other end portion 65, 66' of the shim 63, 63' in question. This makes it possible to reduce the radial excrescences due to the overlapping of the shim. Preferably too, these regions of overlap of the internal shim 63 and external shim 63' are offset angularly so as to minimize the radial excrescences.

The rest of the thickness of the shims 63, 63' is the fruit of a compromise. This is because the thickness of each shim 63, 63' must be as small as possible in order to limit the increase in radial dimension due to its presence, but sufficiently large to ensure rigidity of the coiled insert 68 in order for it to be subsequently handled, depending on the application to which it is intended.

Figure 16:
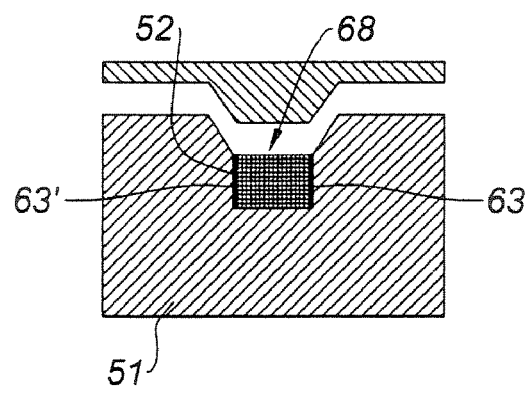
FIG. 16 shows a sectional partial schematic view of a process for manufacturing a component with a coiled composite insert formed according to a process that includes steps for catching the sheet of FIGS. 12 and 13.

Referring to FIG. 16, the coiled insert 68, once formed with its catching or retaining shims 63, 63', is placed in the annular cavity 52 of a container 51, similar to the previously mentioned container or to the containers of the prior art. An annular lid 48 is added and the assembly is compacted by hot isostatic pressing, so as to obtain a component with a composite insert, in a known manner.

The invention claimed is:

1. A process for manufacturing a coiled insert of coated filaments, each filament comprising a ceramic fiber coated with a metal sheath, the process comprising:
   manufacturing a sheet of coated filaments by laser welding; and
   winding a sheet of coated filaments around a piece,
   wherein at the start of winding, a first metal shim is placed beneath the sheet and coiled such that the first metal shim provides an internal part of the coiled insert,
   wherein at the end of winding, a second metal shim is placed on the sheet and coiled such that the second metal shim provides an external part of the coiled insert,
   wherein a portion of an innermost layer of the coiled insert is sandwiched between a first end portion of the first metal shim and a second end portion of the first metal shim, and
   wherein a portion of an outermost layer of the coiled insert is sandwiched between a first end portion of the second metal shim and a second end portion of the second metal shim.

2. The process for manufacturing a coiled insert of coated filaments as claimed in claim 1, wherein the second end portion of the second metal shim covers the outermost layer of the coiled insert and is welded close to the first end portion of the second metal shim.

3. The process for manufacturing a coiled insert of coated filaments as claimed in claim 1, wherein the first end portion of the first metal shim is flush in line with a first end portion of the sheet.

4. The process for manufacturing a coiled insert of coated filaments as claimed in claim 1, wherein, at the end of the process, the coiled insert is removed from the piece onto which it has been coiled with the shims.

5. A coiled insert of coated filaments, formed by the process as claimed in claim 1, comprising:
   a coil of a sheet of coated filaments with a first metal shim which provides an internal part of the coiled insert and a second metal shim which provides an external part of the coiled insert.

6. A process for manufacturing a component with an insert made of a composite having a metal matrix, within which ceramic fibers extend, comprising:
   placing a coiled insert of coated filaments obtained according to the method of claim 1 in an annular cavity of a metal container;
   adding a metal lid to the container to form an assembly; and
   compacting the assembly by hot isostatic pressing.

7. The process for manufacturing a coiled insert of coated filaments as claimed in claim 1, wherein each filament includes a silicon carbide ceramic fiber coated with a titanium alloy.

8. The process for manufacturing a coiled insert of coated filaments as claimed in claim 1, wherein the first metal shim and the second metal shim each include a titanium alloy.

9. The process for manufacturing a coiled insert of coated filaments as claimed in claim 1, wherein a width of the first metal shim and a width of the second metal shim is the same as a width of the sheet of coated filaments.

10. The process for manufacturing a coiled insert of coated filaments as claimed in claim 1, wherein the coiled insert includes a plurality of layers disposed between a first end of the sheet and a second end of the sheet.

* * * * *